Figure 1:
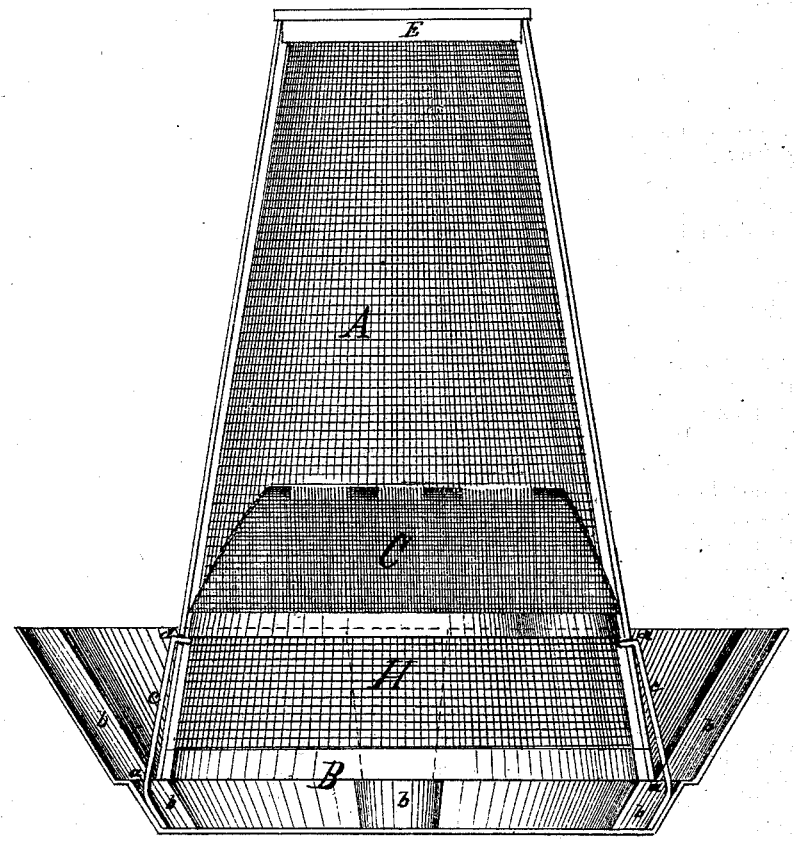

C. E. PENNY.

Improvement in Insect Traps.

No. 120,595.　　　　Patented Nov. 7, 1871.

Attests
H. F. Willson
E. W. Strack

Inventor
C. E. Penny

UNITED STATES PATENT OFFICE.

CHARLES E. PENNY, OF FORT WAYNE, INDIANA, ASSIGNOR TO HIMSELF AND JOHN McCARTNEY, OF SAME PLACE.

IMPROVEMENT IN INSECT-TRAPS.

Specification forming part of Letters Patent No. 120,595, dated November 7, 1871.

*To all whom it may concern:*

Be it known that I, CHARLES E. PENNY, of Fort Wayne, in the county of Allen and State of Indiana, have invented certain new and useful Improvements in Traps for Insects; and I do hereby declare that the following is a full and exact description thereof, reference being had to the accompanying drawing and to the letters of reference marked thereon, in which like letters refer to like parts in the different figures.

To enable others skilled in the arts to make and use my invention, I will proceed to describe its construction and operation.

In the drawing the figure represents a vertical section.

The nature of my invention consists in the construction, as an article of manufacture, of a combination of devices which form, when complete, a trap for the purpose of catching insects.

In the drawing, A represents a conically-formed receiving-chamber, which is manufactured of fine wire-gauze, its base being oval and fitted so as to set into an oval-shaped pan, B, to which it is secured by means of wire springs, as will be more fully described. Pan B is formed on an oval base; its sides extend diagonally upward a short distance, as seen at $a$, where they are turned slightly but abruptly in a horizontal direction so as to form a narrow offset or ledge; they then extend upward to a suitable distance with a considerable flare, as seen in the drawing. Pan B is also fluted at its sides and ends, as seen at $b$, for the purpose of admitting the insects to be caught. The conical chamber A is inserted in pan B so that its lower edge rests on the upper surface of ledge $a$, said ledge forming its seat. $c$ $c$ represent springs, which are secured at their lower ends to the inner side of pan B at its ends, as seen in the drawing. These springs extend upward and form at their upper extremity a catch, $d$, which takes into apertures in the sides of chamber A for the purpose of securing said chamber to the pan, as will be readily understood. C represents a detachable wire decoy, which is constructed as seen in the drawing, its base being just large enough to fit snugly into the chamber A. It extends thence upward so as to form a V-shaped ridge, having its ends contracted as seen in the drawing. At the ridge slits are cut through the gauze about an inch in length. At these slits a few strands of the wire are removed, and the stubs of wire being cut off are sharp and bent upward and form the apertures through which the insects will crawl into the upper chamber; but, when once in it, it is impossible for them to return. Decoy C is provided with a metallic rim, which extends around its base to give it strength, and it is held in the position seen in the drawing by means of catches $d$ $d$ on springs $c$ $c$, which project through the walls of the chamber, as seen in the figure. E represents a cover, which is inserted in the top of the receiving-chamber.

The operation of my invention is as follows: The insects, being attracted by a suitable bait, follow down the sides of the pan B and enter through the openings, formed by the fluting of said pan, into the compartment H, and, after feeding, they fly or crawl up the surface of the decoy C and through the apertures, where they are secured.

What I claim as new, and desire to secure by Letters Patent, is—

Receiving-chamber A, fluted pan B having offset or ledge $a$, decoy C, springs $c$ $c$ subserving the double purpose of securing the receiving-chamber A to the pan B and supporting the decoy C, the whole being arranged, combined, and constructed substantially as described.

C. E. PENNY.

Witnesses:
H. F. WILLSON,
E. U. STRACK.